United States Patent
Itezono

(10) Patent No.: US 6,304,926 B1
(45) Date of Patent: Oct. 16, 2001

(54) SYSTEM FOR GENERATING A SELECTED CLOCK FREQUENCY FOR A PROCESSING UNIT OF AN INTERFACE BASED UPON THE CURRENT CAPACITY OF AN APPARATUS CONNECTED THERETO

(75) Inventor: Toshiyuki Itezono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/100,400

(22) Filed: Jun. 19, 1998

(30) Foreign Application Priority Data

Jun. 25, 1997 (JP) .................................................. 9-184397

(51) Int. Cl.[7] .................................................. G06F 13/14
(52) U.S. Cl. ............................................. 710/63; 713/322
(58) Field of Search ................................ 710/104, 15, 62, 710/63, 64; 713/321, 322, 501, 340

(56) References Cited

U.S. PATENT DOCUMENTS

| | | | |
|---|---|---|---|
| 4,352,169 | * | 9/1982 | Asano ..................................... 368/73 |
| 4,819,211 | * | 4/1989 | Takagi ..................................... 365/230 |
| 5,307,003 | * | 4/1994 | Fairbanks et al. ....................... 323/222 |
| 5,751,172 | * | 5/1998 | Takano ..................................... 327/113 |
| 5,757,631 | * | 5/1998 | Semmler ..................................... 363/41 |
| 5,812,004 | * | 9/1998 | Little ..................................... 327/291 |
| 5,861,959 | * | 1/1999 | Barak ..................................... 358/403 |
| 5,885,011 | * | 3/1999 | Kanazawa ..................................... 400/61 |
| 5,974,560 | * | 10/1999 | Hotta et al. ........................... 713/500 |
| 5,982,570 | * | 11/1999 | Koizumi et al. ....................... 360/69 |
| 5,983,353 | * | 11/1999 | McHann, Jr. .......................... 713/310 |

\* cited by examiner

*Primary Examiner*—Thomas Lee
*Assistant Examiner*—Thuan Du
(74) *Attorney, Agent, or Firm*—Fitzpatrick, Cella, Harper & Scinto

(57) ABSTRACT

An interface device is connected to an OA (office automation) apparatus, such as a printer, a copier, a facsimile apparatus, a scanner or the like, and provides the OA apparatus with a new interface by being supplied with electric power from the OA apparatus. The interface device includes an extended-interface control unit for controlling an interface which is supplied with electric power from the OA apparatus and performs transmission/reception of data to/from the OA apparatus, a clock-frequency control unit for variably controlling an operational clock frequency for the interface device, and a unit for asking the OA apparatus about a current capacity suppliable from the OA apparatus. The clock-frequency control unit controls the clock frequency in order to suppress current consumption of the interface device within the current capacity.

19 Claims, 4 Drawing Sheets

FIG.2

| CLOCK-FREQUENCY MAGNIFICATION | CPU CLOCK FREQUENCY | OUTPUT CLOCK FREQUENCY OF CLOCK-FREQUENCY CONTROL UNIT | CURRENT SUPPLIABLE FROM PRINTER MAIN BODY | SET VALUE (D1, D0) |
|---|---|---|---|---|
| x 1 | 50 MHz | 12.5 MHz | 1.1A | (1,0) |
| x2/3 | 33.3 MHz | 8.33 MHz | 0.8A | (0,1) |
| x1/2 | 25 MHz | 6.25 MHz | 0.6A | (0,0) |

SYSTEM FOR GENERATING A SELECTED CLOCK FREQUENCY FOR A PROCESSING UNIT OF AN INTERFACE BASED UPON THE CURRENT CAPACITY OF AN APPARATUS CONNECTED THERETO

BACKGROUND OF THE INVENTION

1. Field of the Invention

The present invention relates to an extended interface device. More particularly, the invention relates to an extended interface device which is connected to an OA (office automation) apparatus, such as a printer, a copier, a facsimile apparatus, a scanner or the like, and provides the OA apparatus with a new interface function by being supplied with electric power from the main body of the OA apparatus.

2. Description of the Related Art

Recent diffusion of networks, such as LAN's (local area networks) and the like, is remarkable, and, for example, data sharing by a plurality of clients, such as personal computers, work stations and the like, and sharing of input/output apparatuses, such as printers, scanners and the like are also common. This trend extends even to business machines, such as fascimile apparatuses and the like. In accordance with development of digital business machines, the utilization of the input/output function of such a business machine as a printer, a scanner or the like via a network is effected.

Under such circumstances, network interface devices for providing OA apparatuses, such as printers, copiers, facsimile apparatuses, scanners and the like, with a network function of a LAN or the like have been put on the market by various suppliers. Among these devices, there are network interface devices, each connected to an extended interface provided in the main body of an OA apparatus and supplied with electric power from the main body of the OA apparatus via the interface. Extended interface devices for providing the connected OA apparatus with a new interface function other than the network function have also been devised.

The above-described network interface device, which is connected to an extended interface connector of an OA apparatus, such as a printer, a copier, a facsimile apparatus, a scanner or the like, and supplies the OA apparatus with a network interface of a LAN or the like, by being supplied with electric power from the main body of the OA apparatus, has the following problems.

First, it is desirable that unified extended-interface specifications are provided for network interface devices and various kinds of OA apparatuses, and a network interface device of one type deals with various kinds of OA apparatuses. Actually, however, various kinds of OA apparatuses to be dealt with have different specifications. The processing capability requested to a network interface device and the current capacity which can be supplied to the network interface device via an extended interface also differ depending on the OA apparatus.

For example, suppose that a low-speed printer having a printing speed of 4 copies/min and a high-speed printer having a printing speed of 40 copies/min have the same extended interface, and the two printers are dealt with by a network interface device of one type. The high-speed printer requests a high-speed network interface in order to utilize its high printing speed. On the other hand, the low-speed printer requests only a network interface corresponding to its low printing speed, and does not require a high-speed processing capability requested by the high-speed printer for the network interface device. In general, the amount of current suppliable to an extended interface is smaller as the speed of an OA apparatus is lower, because there is a limitation in the space for the power supply. On the other hand, current consumption is larger as the processing capability of a network interface device is higher.

Accordingly, for a network interface device having a high processing capability corresponding to a high-speed copier, the current capacity suppliable from a low-speed printer is insufficient. As a result, it is necessary to prepare network interface devices of two types having the same functions except for their speed.

SUMMARY OF THE INVENTION

It is an object of the present invention to provide an extended interface device which can be commonly used for OA apparatuses having different current capacities.

According to one aspect, the present invention which achieves the above-described object relates to an interface device which is connected to an OA apparatus and provides the OA apparatus with a new interface by being supplied with electric power from the OA apparatus. The interface device includes an extended-interface control unit for controlling an interface which is supplied with electric power from the OA apparatus and performs transmission/reception of data to/from the OA apparatus, a clock-frequency control unit for variably controlling an operational clock frequency for the interface device, and means for asking the OA apparatus about a current capacity suppliable from the OA apparatus. The clock-frequency control unit controls the clock frequency in order to suppress power consumption of the interface device within the current capacity.

According to another aspect, the present invention which achieves the above-described object relates to a device for an electronic apparatus. The device includes a first interface to be connected to the electronic apparatus, a second interface to be connected to the outside, and control means for controlling an operational frequency of the device.

According to still another aspect, the present invention which achieves the above-described object relates to a method for controlling a device for providing an electronic apparatus with a new interface function by being connected to the electronic apparatus. The method includes the steps of determining an operational clock frequency for the device from among a plurality of operational clock frequencies, and controlling clock generation means so as to generate a clock signal having the determined operational clock frequency.

The foregoing and other objects, advantages and features of the present invention will become more apparent from the following description of the preferred embodiments taken in conjunction with the accompanying drawings.

BRIEF DESCRIPTION OF THE PREFERRED EMBODIMENTS

FIG. 2 is a table illustrating setting of a clock frequency in the first embodiment;

DESCRIPTION OF THE PREFERRED EMBODIMENTS

First Embodiment

A description will now be provided of a print server board, which is mounted in a printer or a copier having a unified extended interface and which includes a LAN interface, for providing the printer or the copier with a LAN printing function, according to a first embodiment of the present invention. In the first embodiment, since only the LAN printing function in a copier is illustrated, the copier will also be expressed as a printer as seen from the print server board.

Figure 1:
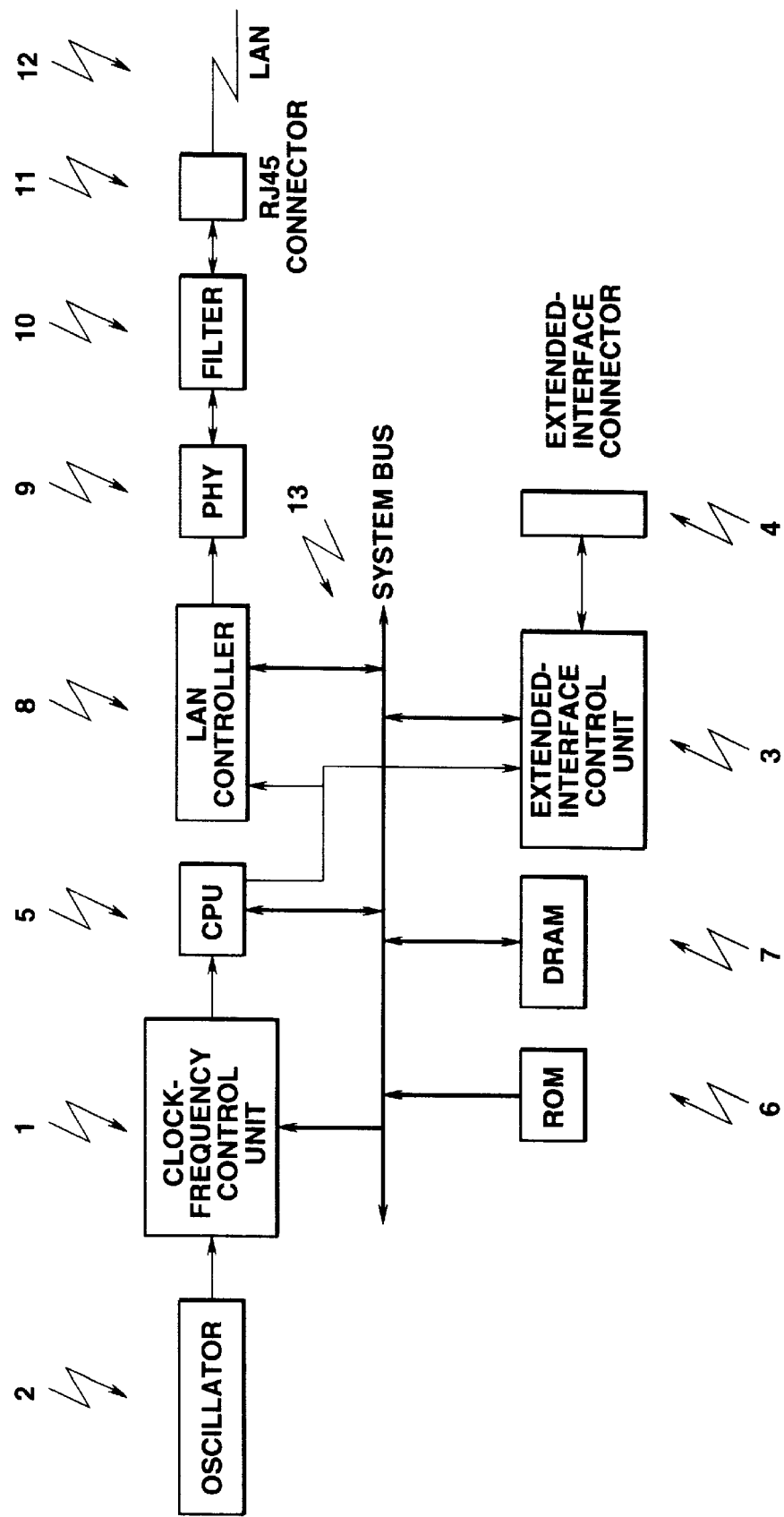
FIG. 1 is a block diagram illustrating a print server board according to a first embodiment of the present invention.

FIG. 1 is a block diagram illustrating the printer server board of the first embodiment. In FIG. 1, a clock-frequency control unit 1 supplies a CPU (central processing unit) 5 (to be described below) with a clock signal having an appropriate frequency in accordance with a power-supply-current capacity suppliable from the printer. An oscillator 2 supplies the clock-frequency control unit 1 with a clock signal having a fixed frequency for providing the clock signal. An extended-interface control unit 3 controls an extended interface for the printer. An extended-interface slot of the printer is connected to an extended-interface connector 4. The CPU 5 controls the entire printer server board.

The CPU 5 has the function of quadruplicating the frequency of the clock signal input from the clock-frequency control unit 1 and outputting the resultant clock signal (this function can of course be served by a dedicated hardware circuit if desired), and supplies the extended-interface control unit 3 and a LAN controller 8 (to be described below) with the clock signal. A ROM (read-only memory) 6 stores boot programs of the print server board and control programs for the print server board. A DRAM (dymanic random access memory) 7 is used as a region where a control program from the ROM 6 is developed, or as a data region.

In the first embodiment, the print server board is booted in the ROM, a control program is transferred from the ROM 6 to the DRAM 7 and is developed in the DRAM 7, and the control program is executed in the DRAM 7 which is higher than the ROM 6. The LAN controller 8 controls a LAN, and performs, in the print server board of the first embodiment, media access control (MAC) of 100 Mbit/s Fast Ethernet. The clock signal from the CPU 5 is input to the LAN controller 8. The LAN controller 8 requests the CPU 5 about bus control, and becomes a bus master according to permission of the CPU 5 to transfer data received from the LAN to the DRAM 7 via a system bus 13. A transceiver 9 takes charge of a physical layer (hence the abbreviation "PHY" in the Fig.) of 100 Base-TX communication of Ethernet. A filter 10 comprises an insulation transformer and an anti-common-mode-noise transformer. An RJ45 connector 11 is a connector for 100 Base-TX. Reference numeral 12 represents a 100 Base-TX cable of the LAN. There is also shown the system bus 13.

Next, a path to transmit data received from the LAN, serving as the print server board, to the printer main body will be briefly described. The LAN controller 8 which has received data from the LAN extracts a source-address-destination address, a packet length and LLC (link layer control) data which are necessary data from a data packet for the LAN controller 8, and stores the extracted data in the DRAM 7 by behaving as the bus master. The CPU 5 performs packet processing of the data transmitted from the LAN controller 8 in the DRAM 7. The extended-interface control unit 3 receives the data subjected to the packet processing and transmits printing data to the printer main body via the extended-interface connector 4. This path is basic in print servers which are currently used in the market.

Next, a description will be provided of the characteristic operation of the present invention based on a table illustrating setting of the clock frequency according to the first embodiment shown in FIG. 2. As shown in the table, in the first embodiment, three clock frequencies, i.e., 50 MHz, which is the highest operating frequency of the CPU 5, 33.3 MHz, which is ⅔ of the highest frequency, and 25 MHz, which is ½ of the highest frequency, can be set. The CPU 5 operates with one of these operating frequencies, and supplies the LAN controller 8 and the extended-interface control unit 3 with a clock signal having the same frequency. The control of the three kinds of clock signals is performed by the clock-frequency control unit 1, which is connected to the system bus 13 and supplies the CPU with one of the three kinds of clock signals according to an instruction of setting from the CPU 5.

The CPU 5 quadruplicates the frequency of the clock signal from the clock-frequency control unit 1 within the CPU 5, and operates at the resultant frequency and simultaneously outputs the resultant clock signal. Accordingly, the clock frequencies output from the clock-frequency control unit 1 are 12.5 MHz, which is the highest frequency, 8.33 MHz, which is ⅔ of the highest frequency, and 6.25 MHz, which is ½ of the heighest frequency. The operation of the clock-frequency control unit 1 is controlled by 2-bit set values ((1,0), (0,1), (0,0)) as shown in FIG. 2. When the power supply is reset, the clock frequency is set to the lowest frequency, 6.25 MHz. The CPU 5 asks the printer main body, via the extended-interface control unit 3, about the power supply current suppliable from the printer. When the suppliable currents are 1.1 A, 0.8 A and 0.6 A, the CPU 5 sets the clock frequency of the clock-frequency control unit 1 to 12.5 MHz, 8.33 MHZ and 6.25 MHz, respectively. The reasons are as follows.

In general, a high-speed copier or printer having, for example, a printing speed of about 40 copies/sec demands a high-speed network interface in order to utilize its high printing speed. On the other hand, a low-speed printer having, for example, a printing speed of about 4 copies/sec only requires a network interface corresponding to its low printing speed, so that such a low-speed printer does not demand the high processing capability necessary for a high-speed copier from a network interface device.

In general, the current capacity suppliable to an extended interface is smaller as the speed of an OA apparatus is lower, because the space for the power supply is limited. The current consumed in the print server device is lower as the processing capability is lower by decreasing the clock frequency. Accordingly, the clock frequency is set to a smaller value as the speed of the OA apparatus is lower with a smaller suppliable current.

As examples of printers used in the first embodiment, consider a high-speed printer having a speed of 40 copies/sec and a current suppliable to an extended interface of 1.1 A, a medium-speed printer having a speed of 16 copies/sec and a current suppliable to an extended interface of 0.8 A, and a low-speed printer having a speed of 4 copies/sec and a current suppliable to an extended interface of 0.6 A. The maximum consumed currents of the print server of the first embodiment are1.0 A, 0.7 A and 0.5 A at the operating frequencies of 12.5 MHz, 8.33 MHz and 6.25 MHz, respectively. Accordingly, the clock frequencies are set to 12.5 MHZ, 8.33 MHz and 6.25 MHz for the high-speed printer, the medium-speed printer and the low-speed printer, respectively.

As described above, the print server of the first embodiment sets a high frequency for a high-speed printer having a high power supply capability to provide a high processing capability, and decreases the frequency and suppresses current consumption for a small-size printer having a low power supply capability, so as to provide a processing capability corresponding to a printer.

Figure 3:
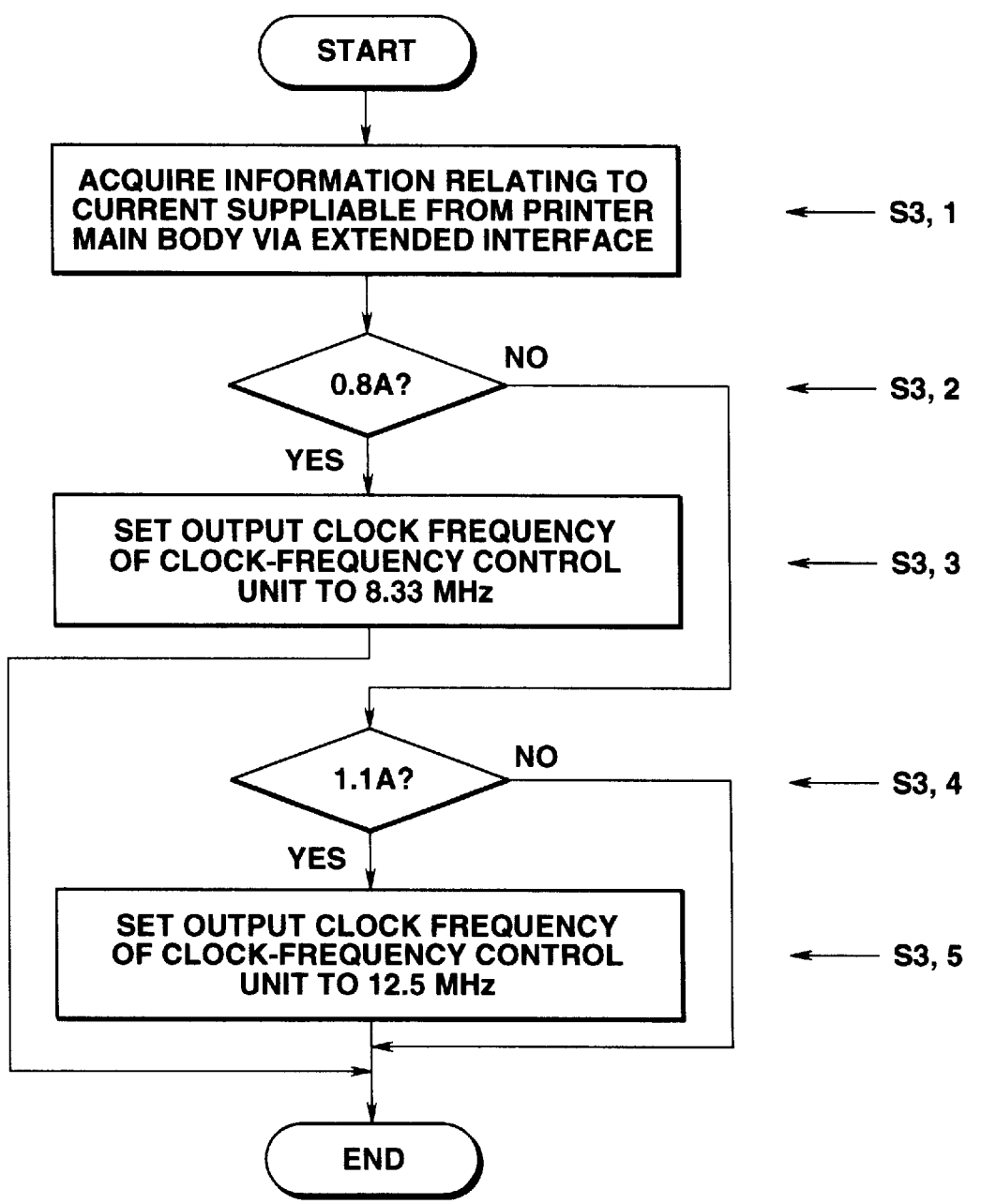
FIG. 3 is a flowchart illustrating an operation for controlling the clock frequency in the first embodiment.

Next, a description will be provided of setting for the clock-frequency control unit 1 with reference to the flowchart illustrating the operation for controlling the clock frequency in the first embodiment shown in FIG. 3.

This processing is performed only when the power supply is reset. when the power supply is reset, the clock frequency of the clock-frequency control unit 1 is set to 6.25 MHz having the lowest current consumption by hardware. After the power supply has been reset, in step S3,1, inquiry is made as to the power-supply current suppliable to the printer main body and such information is obtained, via the extended interface. Then, in step S3,2, it is determined if the acquired suppliable-current information indicates 0.8 A. If the result of the determination in step S3,2 is affirmative, the process proceeds to step S3,3, where the output clock frequency of the clock-frequency control unit 1 is set to 8.33 MHz, and the process is terminated. If the result of the determination in step S3,2 is negative, the process proceeds to step S3,4, where it is determined if the acquired suppliable-current information indicates 1.1 A. If the result of the determination in step S3,4 is affirmative, the process proceeds to step S3,5, where the output clock frequency of the clock-frequency control unit 1 is set to 12.5 MHz, and the process is terminated. If the result of the determination in step S3,4 is negative, the process is immediately terminated.

Figure 4:
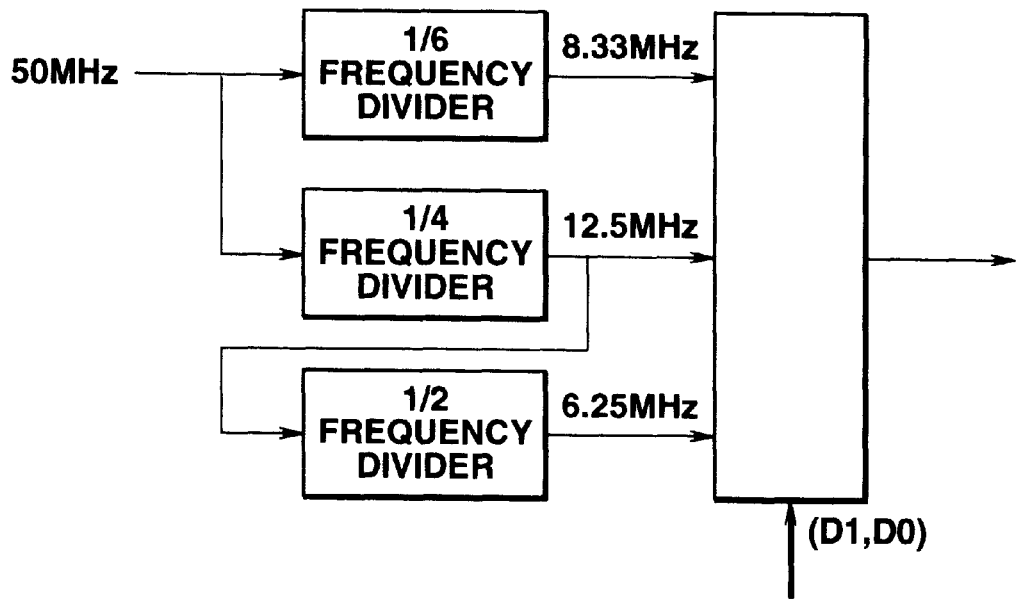
FIG. 4 is a block diagram of a clock-frequency control unit shown in FIG. 1.

Next, the operation of the clock-frequency control unit 1 will be described. FIG. 4 is a block diagram illustrating the configuration of the clock-frequency control unit 1. In FIG. 4, a clock signal having a frequency of 50 MHz is input from the oscillator 2, and the frequency is divided by six to generate a clock signal having a frequency of 8.33 MHz. The frequency of the 50-MHz clock signal is also divided by four to generate a clock signal having a frequency of 12.5 MHz. The frequency of this clock signal is divided by two to generated a clock signal having a frequency of 6.25 MHz. One frequency is selected from among these three frequencies in accordance with two-bit data set by the CPU 5 via the system bus, and the selected frequency is output.

Figure 5:
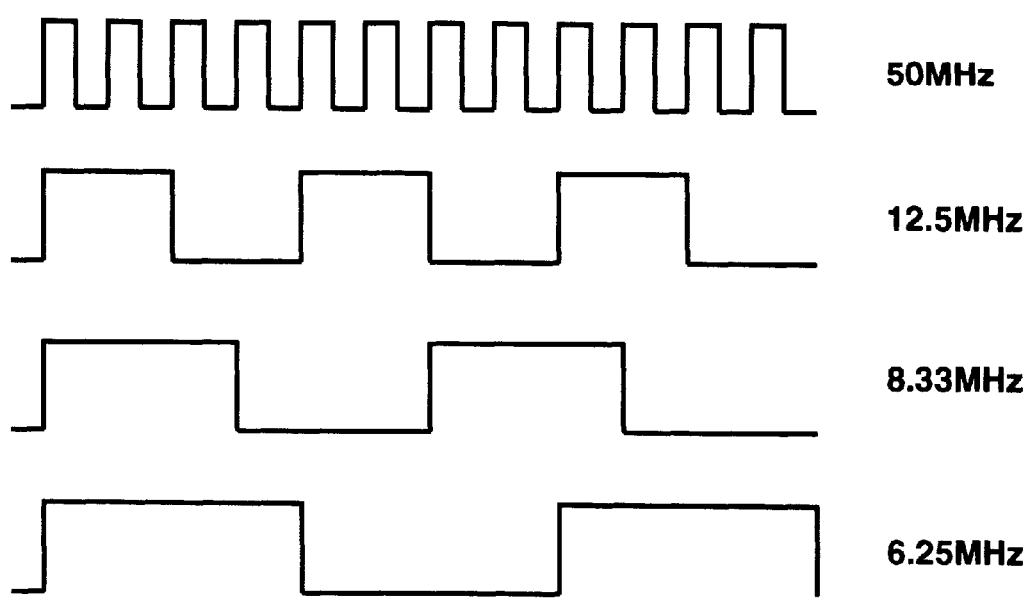
FIG. 5 is a timing chart illustrating the operation of the clock-frequency control unit.

FIG. 5 is a timing chart illustrating the operation of the clock-frequency control unit 1, and illustrates the waveforms of the above-described clock signals having three frequencies which are synchronized with the clock signal having the frequency of 50 MHz.

Second Embodiment

Although in the first embodiment, power-supply-current information is inquired to the main body of the OA apparatus, and the clock frequency is controlled based on the obtained information, the present invention is not limited to such an approach. For example, the operating state of the main body of the OA apparatus may be inquired, and a clock signal having a low frequency may be obtained, for example, in an energy saving mode or a sleep mode. In another approach, such an operation may be combined with the operation of the first embodiment. Alternatively, the clock frequency may be controllled without asking the main body of the OA apparatus. For example, the data processing capability or the power supply capability of the main body of the OA apparatus may be detected, and the clock frequency may be controlled in accordance with the result of the detection.

The present invention is not limited to the above-described embodiments. For example, the print server is not limited to one which supplies a printer with printing data, but may be one which receives data from a scanner and transmits the data to the LAN, or may have these two functions. The interface is not limited to 100 Base-TX Fast Ethernet, and may be any other interface, such as 10 Base-T or 10 Base-2 Ethernet, Token Ring or the like. The network is not limited to a LAN, and may be one corresponding to a WAN (wide area network), such as an ISDN (integrated services digital network) or the like. The interface with the main body of the OA apparatus, such as a printer or the like, may be a general-purpose interface, such as BiCentronics or the like, instead of a particular extended interface, or a plug-in device directly connected to a connector provided on the surface of the main body of the OA apparatus or a device connected via a cable, instead of an incorporated device having a slot within the printer.

Although in the foregoing embodiments, a network interface device has been described, the present invention is not limited to such a device. For example, a device which provides an OA apparatus with a general-purpose interface function, such as SCSI (small computer system interface), RS-232C, Centronics, IEEE 1394 interface or the like may also be used.

As described above, according to the present invention, the extended-interface control unit asks the OA apparatus about the current capacity suppliable from the main body of the OA apparatus, and the clock-frequency control unit controls the frequency of a clock signal so as to suppress the current consumed by the network interface device within the current capacity. Accordingly, for an OA apparatus which demands a high speed from a network interface device and has a high supply current capacity to the network interface device, such as a high-speed copier having a printing speed of 40 copies/min, it is possible to increase the processing capability by increasing the clock frequency. On the other hand, for a small and inexpensive low-speed printer having, for example, a printing speed of 4 copies/min, it is possible to reduce current consumption by decreasing the clock frequency within a range to satisfy the processing capability requested to the network interface device.

That is, a network interface device of one kind can deal with various kinds of OA apparatuses having unified extended interface specifications. Accordingly, it is unnecessary to prepare a plurality of network interface devices having different current consumption values and processing speeds although having the same functions except for the speed. As a result, there is no loss in development, the production quantity of apparatuses of one kind increases, and the unit production cost can be reduced.

The individual components shown in outline or designated by blocks in the drawings are all well-known in the interface device arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An interface device which is connected to an office automation apparatus and provides the office automation apparatus with a new interface based on electric power supplied from the office automation apparatus, said interface device comprising:

a central processing unit for controlling said new interface;

an extended-interface control unit for controlling an interface which is supplied with electric power from the office automation apparatus and performs transmission/reception of data to/from the office automation apparatus;

means for receiving data relating to a current capacity of the office automation apparatus from the office automation apparatus; and a clock-frequency control unit for variably controlling a discrete operational clock frequency of said central processing unit based on data received by said data receiving means, in order to suppress current consumption of said interface device to a value within the current capacity.

2. An interface device according to claim 1, wherein said clock-frequency control unit divides a clock signal from an oscillator into a plurality of clock signals having different clock frequencies, and selectively outputs a clock signal having a predetermined clock frequency according to a control signal corresponding to current capacity data of the office automation apparatus received by said data receiving means.

3. An interface device according to claim 1, wherein said interface device comprises a network interface device for providing the office automation apparatus with a network interface.

4. An interface device according to claim 1, wherein the office automation apparatus comprises at least one of a printer, a copier, a facsimile apparatus and a scanner.

5. A device which is capable of being connected to an electronic apparatus, said device comprising:

a first interface to be connected to said electronic apparatus;

a first processor for controlling said first interface, said first processor operating independently from a second processor in the electronic apparatus;

a second interface to be connected to a computer network; and a clock generator connected to said first processor for generating an operational clock signal provided to said first processor, wherein said first processor comprises:

means for receiving first data and second data from said electronic apparatus via said first interface;

means for transmitting said first data to said computer network; and means for controlling the frequency of the operational clock signal of said first processor generated by said clock signal generator based on said second data.

6. A device according to claim 5, wherein said second interface comprises one of a network interface and a general-purpose interface.

7. A device according to claim 5, wherein said first interface comprises one of an extended interface and a general-purpose interface.

8. A device according to claim 5, further comprising means for detecting an operational state and/or a capability of said electronic apparatus, wherein said frequency controlling means controls an operational frequency of said device based on a detection result of said detecting means.

9. A device according to claim 8, wherein said detecting means comprises means for asking said electronic apparatus about the operational state and/or the capability of the electronic apparatus via said first interface.

10. A device according to claim 5, wherein said device is supplied with electric power from said electronic apparatus via said first interface.

11. A device according to claim 10, further comprising means for detecting an electric power supply capability of said electronic device, wherein said frequency controlling means controls the operational frequency of said device based on the detected electric power supply capability.

12. A device according to claim 5, wherein said electronic apparatus comprises one of a printer, a copier, a facsimile apparatus and a scanner.

13. A method for controlling an interface device for providing an electronic apparatus with a new interface function when connected to the electronic apparatus, said method comprising the steps of:

controlling the interface device using a central processing unit;

detecting an operational clock frequency for the central processing unit controlling the interface device from among a plurality of operational clock frequencies based on a current capacity of the electronic apparatus; and controlling clock signal generation means connected to the interface device so as to generate a clock signal having the operational clock frequency detected in the detecting step for controlling the central processing unit.

14. A method according to claim 13, wherein the new interface function is one of a network interface function and a general-purpose interface function.

15. A method according to claim 13, wherein the device is connected to the electronic apparatus via one of an extended interface and a general-purpose interface.

16. A method according to claim 13, further comprising the step of detecting an operational state and/or a capability of the electronic apparatus, wherein said clock signal controlling step controls the clock signal generation means based on the result of the detection in said detecting step.

17. A method according to claim 16, wherein said step of detecting the operational state and/or the capability of the electronic apparatus comprises the step of asking the electronic apparatus about the operational state and/or the capability of the electronic apparatus.

18. A method according to claim 16, wherein the device receives electronic power from the electronic apparatus, and wherein said step of detecting the operational state and/or the capability of the electronic apparatus comprises detecting an electric power supply capability of the electronic apparatus.

19. A method according to claim 16, further comprising the step of determining that, when a detection result of said detecting step is that the electronic apparatus is in one of a sleep mode and an energy saving mode, the device is to be operated with a clock signal having a low frequency.

* * * * *

UNITED STATES PATENT AND TRADEMARK OFFICE
CERTIFICATE OF CORRECTION

PATENT NO.   : 6,304,926 B1
DATED        : October 16, 2001
INVENTOR(S)  : Toshiyuki Itezono It is certified that error appears in the above-identified patent and that said Letters Patent is hereby corrected as shown below:

Column 3,
Line 34, "(dymanic" should read -- (dynamic --

Column 5,
Line 13, "reset. when" should read -- reset. When --
Line 65, "controllled" should read -- controlled --

Column 6,
Line 41, "inexensive" should read -- inexpensive --

Signed and Sealed this

Eighteenth Day of June, 2002

Attest:

Attesting Officer

JAMES E. ROGAN
*Director of the United States Patent and Trademark Office*